(12) United States Patent
Lemonds et al.

(10) Patent No.: US 6,611,857 B1
(45) Date of Patent: Aug. 26, 2003

(54) METHOD AND SYSTEM FOR REDUCING POWER IN A PARALLEL-ARCHITECTURE MULTIPLIER

(75) Inventors: Carl E. Lemonds, Austin, TX (US); Alan Gatherer, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 500 days.

(21) Appl. No.: 09/713,583

(22) Filed: Nov. 15, 2000

Related U.S. Application Data

(60) Provisional application No. 60/174,620, filed on Jan. 5, 2000.

(51) Int. Cl.[7] ................................................. G06F 7/52
(52) U.S. Cl. ...................................................... 708/629
(58) Field of Search ......................................... 708/629

(56) References Cited

U.S. PATENT DOCUMENTS

| | | | | |
|---|---|---|---|---|
| 5,787,029 A | * | 7/1998 | de Angel | 708/628 |
| 5,805,491 A | * | 9/1998 | Bechade | 708/708 |
| 6,434,587 B1 | * | 8/2002 | Liao et al. | 708/629 |
| 2001/0016865 A1 | * | 8/2001 | Goto | 708/708 |

* cited by examiner

*Primary Examiner*—David H. Malzahn
(74) *Attorney, Agent, or Firm*—Robert D. Marshall, Jr.; W. James Brady, III; Frederick J. Telecky, Jr.

(57) ABSTRACT

A multiplier (12) is disclosed that includes an encoder (36), a hierarchy of compressors (40, 42, 44, 50, 52, 60 and 70), a bit detector (130) and a switch (134). The encoder (36) is operable to receive a first and second encoder input. The compressors (40, 42, 44, 50, 52, 60 and 70) are coupled to the encoder (36). The compressors (40, 42, 44, 50, 52, 60 and 70) are operable to receive a first number of inputs and to generate a second number of outputs, with the second number being less than the first number. The bit detector (130) is operable to monitor the first encoder input to determine whether the first encoder input is in a reduced precision range (28). The bit detector (130) is also operable to deactivate a subset of the compressors (40 and 50) when the bit detector (130) determines that the first encoder input is in the reduced precision range (28). The switch (134) is coupled to a specified one of the compressors (42). The switch (134) is operable to redirect the path of one of the outputs for the specified compressor (42) such that the subset of the compressors (40 and 50) is removed from the path when the bit detector (130) determines that the first encoder input is in the reduced precision range (28).

20 Claims, 2 Drawing Sheets

METHOD AND SYSTEM FOR REDUCING POWER IN A PARALLEL-ARCHITECTURE MULTIPLIER

This application claims priority under 35 USC §119(e)(1) of Provisional Application No. 60/174,620, filed Jan. 5, 2000.

TECHNICAL FIELD OF THE INVENTION

This invention relates generally to digital signal processing and more particularly to a method and system for reducing power in a parallel-architecture multiplier.

BACKGROUND OF THE INVENTION

In the art of digital signal processing, power efficiency and speed are becoming increasingly important. As digital signal processing (DSP) chips are designed to operate with higher clock frequencies, one of the critical paths is through the multiplier.

Typically, DSP applications utilize multipliers with an array architecture because of their compact layout and relatively small parasitic wiring capacitance on internal nodes, in addition to the fact that they are generally easier to pipeline than multipliers with a parallel architecture. However, array-architecture multipliers are also slower than equivalent parallel-architecture multipliers.

Simply using a faster multiplier, however, is an unsatisfactory solution to the problem. This is because dynamic power requirements increase linearly with clock frequency. Thus, the higher the clock frequency, the more power that is required for the multiplier.

SUMMARY OF THE INVENTION

In accordance with the present invention, a method and system for reducing power in a parallel-architecture multiplier are provided that substantially eliminate or reduce disadvantages and problems associated with previously developed systems and methods. In particular, a multiplier is disclosed that provides the speed of a parallel-architecture multiplier and that reduces power requirements by allowing the temporary deactivation of parts of the multiplier when those parts are unnecessary for performing a multiplication.

In one embodiment of the present invention, a multiplier is provided that includes an encoder, a hierarchy of compressors, a bit detector and a switch. The encoder is operable to receive a first and second encoder input. The compressors are coupled to the encoder. The compressors are operable to receive a first number of inputs and to generate a second number of outputs, with the second number being less than the first number. The bit detector is operable to monitor the first encoder input to determine whether the first encoder input is in a reduced precision range. The bit detector is also operable to deactivate a subset of the compressors when the bit detector determines that the first encoder input is in the reduced precision range. The switch is coupled to a specified one of the compressors. The switch is operable to redirect the path of one of the outputs for the specified compressor such that the subset of the compressors is removed from the path when the bit detector determines that the first encoder input is in the reduced precision range.

Technical advantages of the present invention include providing an improved parallel-architecture multiplier. In particular, a bit detector monitors an input to the multiplier to determine when parts of the multiplier are not needed for multiplying that input. As a result, the unnecessary parts of the multiplier may be temporarily deactivated. Accordingly, the speed of a parallel-architecture multiplier is provided, while power requirements are reduced. In addition, low power, high performance digital signal processing chips may be fabricated with the improved multiplier.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
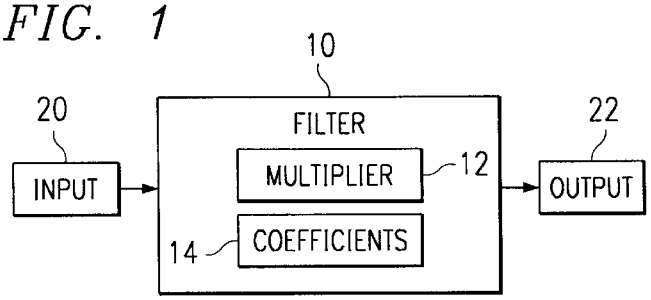
FIG. 1 is a block diagram illustrating a filter including a parallel-architecture multiplier constructed in accordance with one embodiment of the present invention.

FIG. 1 is a block diagram illustrating a filter 10 constructed in accordance with one embodiment of the present invention. The filter 10 comprises a parallel-architecture multiplier 12 and a set of filter coefficients 14 for performing the filtering function. In accordance one embodiment of the present invention, the filter 10 may comprise a low-pass filter for use in a digital signal processing application such as a digital receiver or other suitable digital application. It will be understood, however, that the filter 10 may comprise a high-pass filter or any other suitable filter without departing from the scope of the present invention.

In operation, the filter 10 receives data from an input 20 for filtering. The input 20 may comprise hardware, software, or a combination thereof capable of providing data for filtering. Using the multiplier 12, the filter 10 multiplies the data from the input 20 by the filter coefficients 14 to generate filtered data. It will be understood that other suitable operations may be performed on the data by the filter 10. The filter 10 then provides the filtered data to an output 22. The output 22 may also comprise hardware, software, or a combination thereof capable of receiving filtered data.

Figure 2:
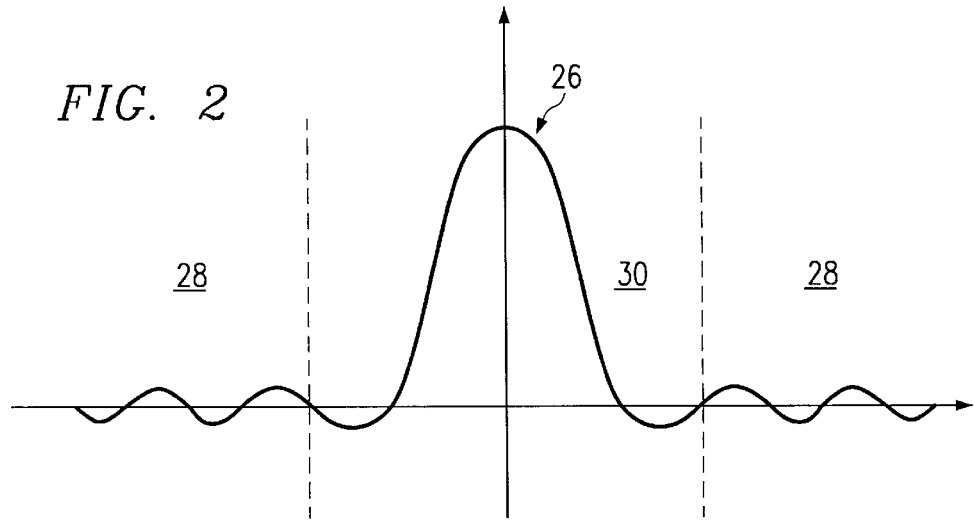
FIG. 2 is a graph illustrating an exemplary function for providing filter coefficients for the filter of FIG. 1 in accordance with one embodiment of the present invention.

FIG. 2 is a graph illustrating an exemplary function 26 for providing filter coefficients 14 for the filter 10 in accordance with one embodiment of the present invention. The coefficients 14 may comprise a specified number of discrete points along the function 26. According to an exemplary embodiment, each of the coefficients 14 comprises sixteen bits of precision. It will be understood, however, that any suitable number of bits of precision may be used without departing from the scope of the present invention. The operations performed by the filter 10 on the input data, which include multiplying the input data by the coefficients 14, provide the convolution of the input data and the function 26. This convolution corresponds to the filtered output data.

The illustrated function 26, which corresponds to a low-pass filter 10, comprises reduced precision ranges 28 and a standard precision range 30. The reduced precision ranges 28 produce coefficients 14 that comprise relatively small positive and negative values. According to the exemplary embodiment, the values are small enough such that the coefficients 14 from these ranges 28 require no more than ten bits of precision. The standard precision range 30, on the other hand, produces coefficients 14 that may require more than ten bits of precision. Thus, for the reduced precision ranges 28, at least six of the higher order bits are the same: 0s for small positive values and 1s for small negative values.

According to the exemplary embodiment, the percentage of coefficients 14 produced by the reduced precision ranges 28 is approximately 60%, while the percentage of coefficients 14 produced by the standard precision range 30 is approximately 40%. Thus, as described in more detail below in connection with FIG. 3, the multiplier 12 may be optimized by detecting coefficients 14 in the reduced precision ranges 28 and, upon detection, removing power to parts, or components, of the multiplier 12 that are useful only for coefficients 14 with more precision. This detection maybe accomplished by monitoring the higher order bits of the coefficients 14 in order to determine when the coefficients 14 are within the reduced precision ranges 28 based on those higher order bits all being the same value.

Figure 3:
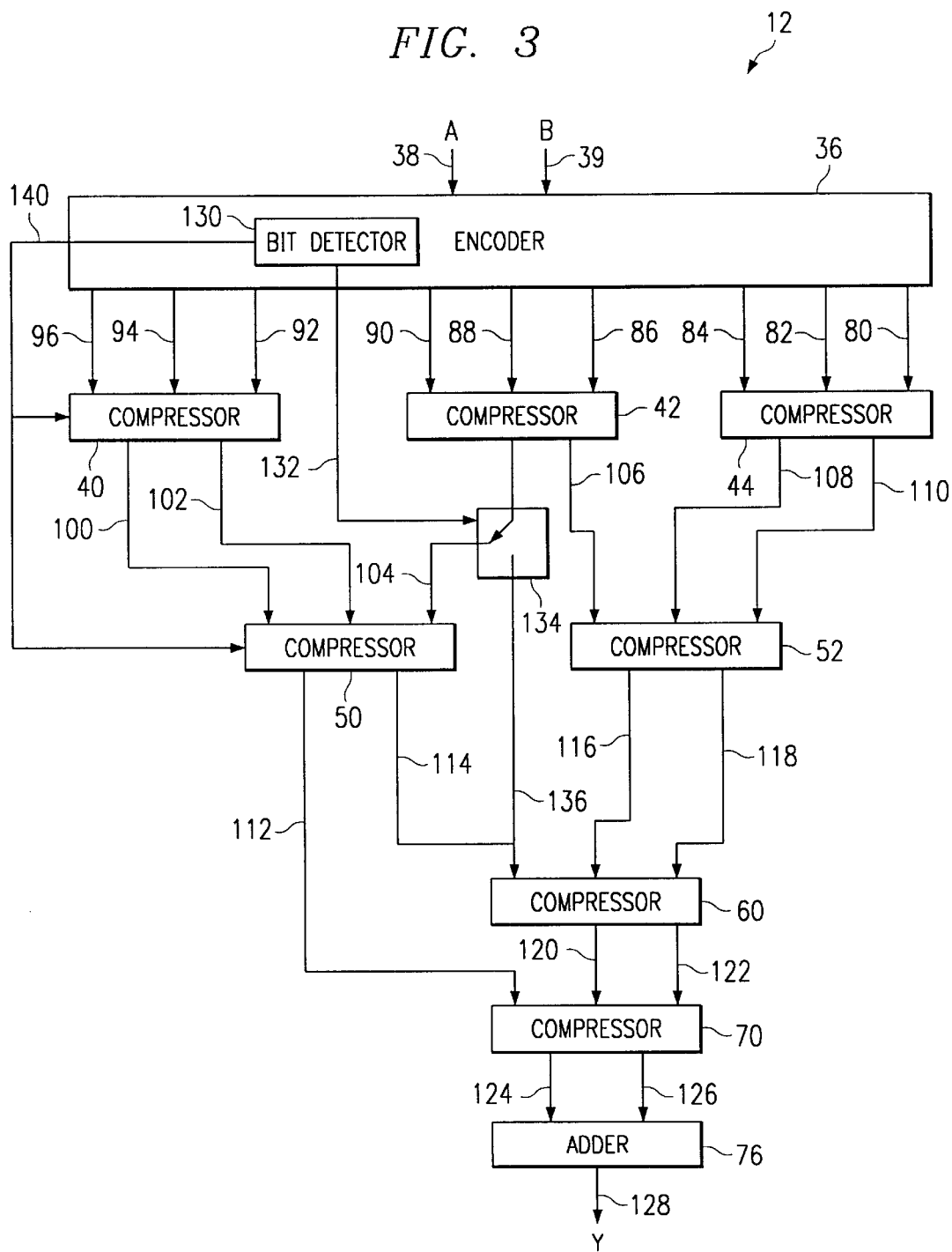
FIG. 3 is a block diagram illustrating the multiplier of FIG. 1 constructed in accordance with one embodiment of the present invention.

FIG. 3 is a block diagram illustrating the multiplier 12, which may be used in a filter 10 as previously described, in an arithmetic circuit, or in any other suitable digital application. According to an exemplary embodiment, the multiplier 12 is a parallel-architecture multiplier 12 for multiplying two sixteen-bit signed or two seventeen-bit unsigned inputs, A and B. It will be understood, however, that the inputs may comprise any suitable number of bits without departing from the scope of the present invention. Inputs A and B each comprise bits 0 through 15, with 0 the lowest order bit and 15 the highest.

The multiplier 12 comprises an encoder 36 for optimizing the performance of the multiplier 12. According to one embodiment, the encoder 36 utilizes a modified radix-4 Booth algorithm for multiplying the inputs A and B. For this embodiment, a plurality of partial products are generated based on specified bits of one of the inputs. For the exemplary embodiment, the partial products are generated based on specified bits of the input B. These partial products may then be added together to generate the multiplication result, which is illustrated in FIG. 3 as Y.

For the exemplary embodiment, nine partial products (PP0–PP8) are generated by the encoder 36 as follows. Initially, specified bits of B are associated with each of the nine partial products as shown in Table 1 below.

TABLE 1

| Partial Product | Bits of B |
| --- | --- |
| 0 | 1, 0 |
| 1 | 3, 2, 1 |
| 2 | 5, 4, 3 |
| 3 | 7, 6, 5 |
| 4 | 9, 8, 7 |
| 5 | 11, 10, 9 |
| 6 | 13, 12, 11 |
| 7 | 15, 14, 13 |
| 8 | 16, 15 |

Each of the partial products may then be generated in accordance with Table 2, as shown below, with $b_n$ indicating the $n^{th}$ bit of B and with A indicating the second input as previously described.

TABLE 2

| $b_{n+2}$ $b_{n+1}$ $b_n$ | Partial Product |
| --- | --- |
| 0 0 0 | 0 * A |
| 0 0 1 | +1 * A |
| 0 1 0 | +1 * A |
| 0 1 1 | +2 * A |
| 1 0 0 | −2 * A |
| 1 0 1 | −1 * A |
| 1 1 0 | −1 * A |
| 1 1 1 | 0 * A |

Thus, for example, bits 5, 4 and 3 of B are used to determine the third partial product, or PP2. If those bits are 1, 0 and 1, respectively, PP2 is generated by multiplying A by −1. Each of the partial products PP1–PP7 is generated by the encoder 36 in the same manner. PP0 and PP8 are similarly generated. However, because PP0 and PP8 are associated with only two bits of B, a 0 is included for $b_{n+2}$ in order to generate these partial products.

Referring back to Table 1, for coefficients 14 in the reduced precision ranges 28, only ten bits of precision are necessary as previously described. Thus, PP6, PP7 and PP8, which are based on bits 11–16, may be set to zero for these coefficients 14.

Referring to FIG. 3, the multiplier 12 comprises the encoder 36 for receiving the inputs A and B and for generating the partial products, a plurality of three-to-two compressors 40, 42, 44, 50, 52, 60 and 70 for receiving three inputs and generating two outputs, and an adder 128 for generating the multiplication result Y. The compressors 40, 42, 44, 50, 52, 60 and 70 each add the three inputs received and generate a sum value and a carry value as outputs.

In normal operation, the multiplier 12 provides the inputs A and B to the encoder 36 on lines 38 and 39. For the embodiment in which the multiplier 12 is implemented as part of a filter 10, these inputs may be a piece of data from the input 20 and a coefficient 14. The encoder 36 generates the partial products based on the inputs as described above. The encoder 36 provides PP0 on line 80, PP1 on line 82, and PP2 on line 84 to compressor 44, PP3 on line 86, PP4 on line 88, and PP5 on line 90 to compressor 42, and PP6 on line 92, PP7 on line 94, and PP8 on line 96 to compressor 40.

Compressor 40 adds PP6, PP7 and PP8 and generates a sum value and a carry value which are provided to compressor 50 on lines 100 and 102. Compressor 42 adds PP3, PP4 and PP5 and generates a sum value and a carry value. The carry value is provided to compressor 50 on line 104 and the sum value is provided to compressor 52 on line 106. It will be understood that the sum value and the carry value generated by each of the compressors 40, 42, 44, 50, 52, 60 and 70 may be provided on either of the lines emanating from the compressor 40, 42, 44, 50, 52, 60 and 70 without departing from the scope of the present invention. Compressor 44 adds PP0, PP1 and PP2 and generates a sum value and a carry value which are provided to compressor 52 on lines 108 and 110.

Compressor 50 adds the values from lines 100, 102 and 104 and generates a sum value and a carry value. The carry value is provided to compressor 70 on line 112 and the sum value is provided to compressor 60 on line 114. Compressor 52 adds the values from lines 106, 108 and 110 and generates a sum value and a carry value which are provided to compressor 60 on lines 116 and 118.

Compressor 60 adds the values from lines 114, 116 and 118 and generates a sum value and a carry value which are provided to compressor 70 on lines 120 and 122. Compressor 70 adds the values from lines 112, 120 and 122 and generates a sum value and a carry value which are provided to the adder 76 on lines 124 and 126. The adder 76 adds the values from lines 124 and 126 and generates the multiplication result Y on line 128.

The encoder 36 comprises a bit detector 130 for monitoring the higher order bits of the input B, as described in more detail above. When the bit detector 130 detects an input B in a reduced precision range 28, PP6, PP7 and PP8 are not necessary for performing the multiplication. Thus, in this situation, the multiplier 12 may be transitioned from a normal power state to a reduced power state. This may be accomplished by the bit detector 130 providing a signal on line 132 to a switch 134. It will be understood that the bit detector 130 may prompt any other suitable component to provide a signal to the switch 134, as opposed to the bit detector 130 providing the signal itself, without departing from the scope of the present invention. The switch 134 changes the path of the carry output from compressor 42 such that the carry output is provided on line 136 to compressor 60, instead of on line 104 to compressor 50.

The bit detector 130 also deactivates compressors 40 and 50. This may be accomplished by the bit detector 130 providing a deactivation signal on line 140 to compressors 40 and 50. As with the signal to the switch 134, it will be understood that the bit detector 130 may prompt any other suitable component to provide a deactivation signal to compressors 40 and 50, as opposed to the bit detector 130 providing the deactivation signal itself, without departing from the scope of the present invention. This allows compressors 40 and 50, which generate outputs based on PP6, PP7 and PP8, to be temporarily deactivated, thereby conserving power. It will be understood that the bit detector 130 may provide the signals to compressors 40 and 50 and to the switch 134 on a single line, on two different lines to any combination of the compressors 40 and 50 and the switch 134, or on three different lines to each without departing from the scope of the present invention. For static logic, the signal on line 140 may comprise a disable signal in order to deactivate compressors 40 and 50. For dynamic logic, the signal on line 140 may comprise a non-cycling, or steady, clock signal in order to deactivate compressors 40 and 50.

The bit detector 130 also provides signals within the encoder 36 to deactivate the parts of the encoder 36 that generate PP6, PP7 and PP8 in order to further reduce power requirements for the multiplier 12. It will be understood that one of the compressors 60 or 70 may also be deactivated without departing from the scope of the present invention. For example, compressor 60 may be deactivated and lines 136, 116 and 118 may be routed to compressor 70. Alternatively, compressor 70 may be deactivated and lines 120 and 122 may be routed to the adder 76.

In accordance with the embodiment in which the multiplier 12 is implemented as part of a filter 10, the coefficients 14 gradually increase as they move from a reduced precision range 28 to the standard precision range 30 and gradually decrease as they move from the standard precision range 30 to a reduced precision range 28. Thus, once the multiplier 12 transitions from the normal power state to the reduced power state by deactivating the compressors 40 and 50 and parts of the encoder 36, the multiplier 12 remains in the reduced power state until the bit detector 130 detects an input B in the standard precision range 30. Thus, the multiplier 12 in this embodiment is optimized by not having to alternate relatively frequently between normal and reduced power states.

Figure 4:
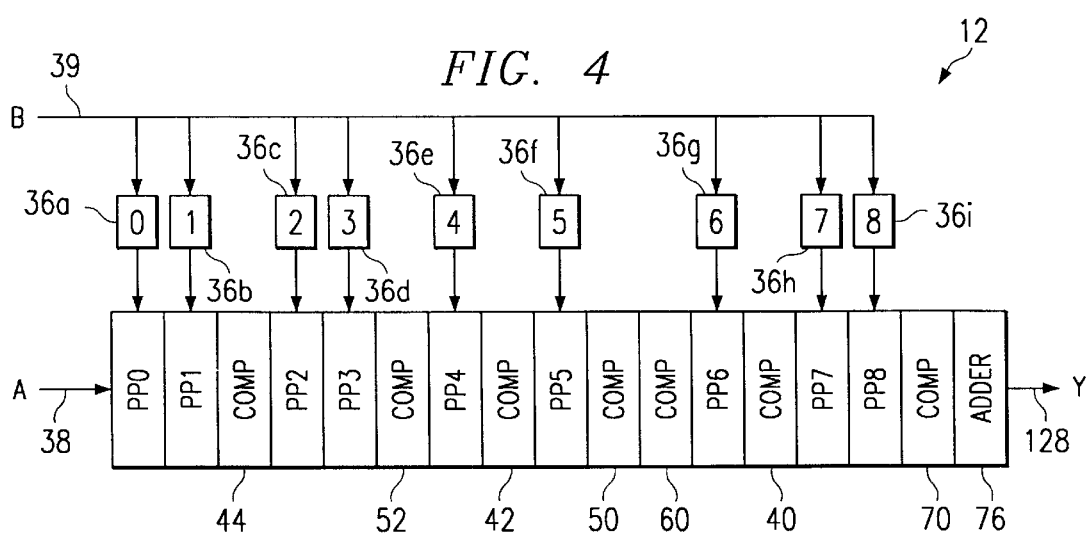
FIG. 4 is a block diagram illustrating one embodiment of a circuit layout for the multiplier of FIG. 3.

FIG. 4 is a block diagram illustrating one embodiment of a circuit layout for the multiplier 12. According to an exemplary embodiment, the encoder 36 comprises sub-encoders 36a–i. Specified bits of input B are provided on line 39 to the sub-encoders 36a–i. As shown above in Table 1, bits 0 and 1 are provided to sub-encoder 36a to generate PP0, bits 1, 2 and 3 are provided to sub-encoder 36b to generate PP1, bits 3, 4 and 5 are provided to sub-encoder 36c to generate PP2, bits 5, 6 and 7 are provided to sub-encoder 36d to generate PP3, bits 7, 8 and 9 are provided to sub-encoder 36e to generate PP4, bits 9, 10 and 11 are provided to sub-encoder 36f to generate PP5, bits 11, 12 and 13 are provided to sub-encoder 36g to generate PP6, bits 13, 14 and 15 are provided to sub-encoder 36h to generate PP7, and bits 15 and 16 are provided to sub-encoder 36i to generate PP8.

According to the exemplary embodiment, compressor 44 is adjacent to PP1 and PP2, compressor 52 is adjacent to PP3 and PP4, and compressor 42 is adjacent to PP4 and PP5. Compressor 50 is adjacent to PP5, and compressor 60 is adjacent to compressor 50 and PP6. Compressor 40 is adjacent to PP6 and PP7, compressor 70 is adjacent to PP8, and the adder 76 is adjacent to compressor 70. This layout is preferable in order to minimize the area requirements for the circuit, as well as to provide optimal spacing for wiring the components together.

Although the present invention has been described with several embodiments, various changes and modifications may be suggested to one skilled in the art. It is intended that the present invention encompass such changes and modifications as fall within the scope of the appended claims.

What is claimed is:

1. A multiplier, comprising:
   an encoder operable to receive a first and second encoder input;
   a hierarchy of compressors coupled to the encoder, the compressors operable to receive a first number of inputs and to generate a second number of outputs, the second number less than the first number;
   a bit detector operable to monitor the first encoder input to determine whether the first encoder input is in a reduced precision range and operable to deactivate a subset of the compressors when the bit detector determines that the first encoder input is in the reduced precision range; and
   a switch coupled to a specified one of the compressors, the switch operable to redirect the path of one of the outputs for the specified compressor such that the subset of the compressors is removed from the path when the bit detector determines that the first encoder input is in the reduced precision range.

2. The multiplier of claim 1, further comprising:
   the encoder further operable to generate a plurality of partial products based on the first and second encoder inputs; and
   the bit detector further operable to deactivate a part of the encoder that is operable to generate a subset of the partial products associated with the subset of the compressors when the bit detector determines that the first encoder input is in the reduced precision range.

3. The multiplier of claim 1, the first encoder input comprising a plurality of bits, the bit detector operable to determine that the first encoder input is in the reduced precision based on a specified number of the bits for the first encoder input comprising a same value.

4. The multiplier of claim 1, the bit detector operable to deactivate the subset of the compressors by providing a disable signal to the subset of the compressors.

5. The multiplier of claim 1, the bit detector operable to deactivate the subset of the compressors by providing a steady clock signal to the subset of the compressors.

6. The multiplier of claim 1, further comprising an adder coupled to one of the compressors, the adder operable to generate an output for the multiplier based on the outputs generated by the compressors.

7. The multiplier of claim 1, further comprising:
the bit detector further operable to activate the subset of the compressors when the bit detector determines that the first encoder input is in a standard precision range; and
the switch further operable to redirect the path of one of the outputs for the specified compressor such that the subset of the compressors is returned to the path when the bit detector determines that the first encoder input is in the standard precision range.

8. The multiplier of claim 1,
the compressors comprising a first, second and third compressor coupled to the encoder, a fourth compressor coupled to the first and second compressors, a fifth compressor coupled to the second and third compressors, a sixth compressor coupled to the fourth and fifth compressors, and a seventh compressor coupled to the fourth and sixth compressors;
the encoder operable to generate nine partial products and operable to provide three of the partial products to each of the first, second and third compressors;
the bit detector operable to deactivate the first and fourth compressors when the bit detector determines that the first encoder input is in the reduced precision range; and
the specified compressor comprising the second compressor, the switch operable to redirect the path of one of the outputs for the second compressor from the fourth compressor to the sixth compressor when the bit detector determines that the first encoder input is in the reduced precision range.

9. A method for reducing power in a multiplier, comprising:
receiving a first and second encoder input at an encoder;
monitoring with the bit detector the first encoder input to determine whether the first encoder input is in a reduced precision range;
coupling a hierarchy of compressors to the encoder;
receiving at each of the compressors a first number of inputs;
generating with each of the compressors a second number of outputs, the second number less than the first number;
deactivating with the bit detector a subset of the compressors when the bit detector determines that the first encoder input is in the reduced precision range; and
redirecting the path of one of the outputs for a specified compressor such that the subset of the compressors is removed from the path when the bit detector determines that the first encoder input is in the reduced precision range.

10. The method of claim 9, further comprising:
generating with the encoder a plurality of partial products based on the first and second encoder inputs; and
deactivating with the bit detector a part of the encoder that is operable to generate a subset of the partial products associated with the subset of the compressors when the bit detector determines that the first encoder input is in the reduced precision range.

11. The method of claim 9, the first encoder input comprising a plurality of bits, and monitoring with the bit detector the first encoder input to determine whether the first encoder input is in a reduced precision range comprising monitoring with the bit detector the first encoder input to determine whether a specified number of the bits for the first encoder input comprise a same value.

12. The method of claim 9, deactivating with the bit detector a subset of the compressors comprising providing a disable signal to the subset of the compressors.

13. The method of claim 9, deactivating with the bit detector a subset of the compressors comprising providing a steady clock signal to the subset of the compressors.

14. The method of claim 9, further comprising:
coupling an adder to one of the compressors; and
generating with the adder an output for the multiplier based on the outputs generated by the compressors.

15. The method of claim 9, further comprising:
activating with the bit detector the subset of the compressors when the bit detector determines that the first encoder input is in a standard precision range; and
redirecting the path of the one of the outputs for the specified compressor such that the subset of the compressors is returned to the path when the bit detector determines that the first encoder input is in the standard precision range.

16. A digital filter comprising a multiplier, the multiplier comprising:
an encoder operable to receive a first and second encoder input, the encoder comprising a bit detector operable to monitor the first encoder input to determine whether the first encoder input is in a reduced precision range;
a hierarchy of compressors coupled to the encoder, the compressors operable to receive a first number of inputs and to generate a second number of outputs, the second number less than the first number;
the bit detector operable to deactivate a subset of the compressors when the bit detector determines that the first encoder input is in the reduced precision range; and
a switch coupled to a specified one of the compressors, the switch operable to redirect the path of one of the outputs for the specified compressor such that the subset of the compressors is removed from the path when the bit detector determines that the first encoder input is in the reduced precision range.

17. The filter of claim 16,
the encoder further operable to generate a plurality of partial products based on the first and second encoder inputs; and
the bit detector further operable to deactivate a part of the encoder that is operable to generate a subset of the partial products associated with the subset of the compressors when the bit detector determines that the first encoder input is in the reduced precision range.

18. The filter of claim 16, the first encoder input comprising a plurality of bits, the bit detector operable to determine that the first encoder input is in the reduced precision based on a specified number of the bits for the first encoder input comprising a same value.

19. The filter of claim 16, the bit detector operable to deactivate the subset of the compressors by providing a disable signal to the subset of the compressors.

20. The filter of claim 16, the bit detector operable to deactivate the subset of the compressors by providing a steady clock signal to the subset of the compressors.

* * * * *